Feb. 10, 1953  J. H. T. LEDRUT  2,628,233
SUBSTITUTED AND UNSUBSTITUTED BARBITURATES AND
THIOBARBITURATES OF 1,2,3-TRISUBSTITUTED
PYRAZOLONES AND PROCESSES OF PRODUCING
SUCH COMPOSITIONS
Filed Dec. 19, 1950
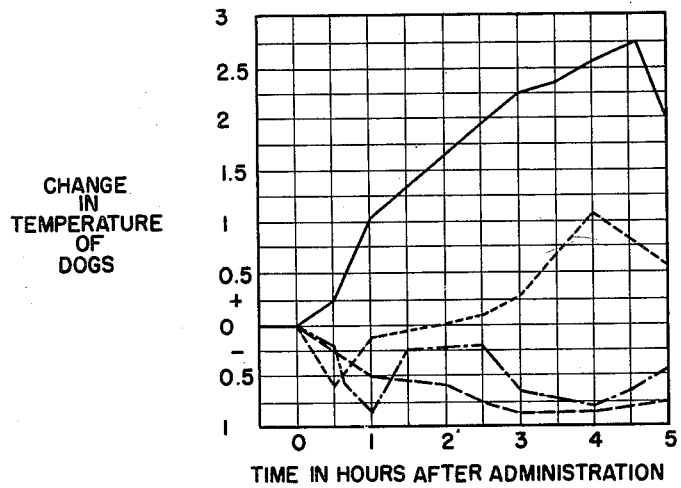
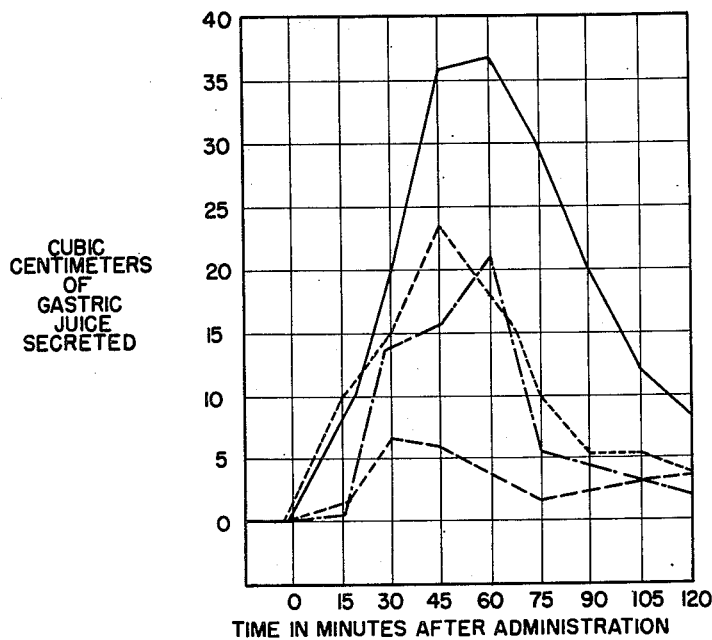
INVENTOR.
JULES H. T. LEDRUT
BY
ATTORNEY.

Patented Feb. 10, 1953

2,628,233

UNITED STATES PATENT OFFICE 2,628,233

SUBSTITUTED AND UNSUBSTITUTED BARBITURATES AND THIOBARBITURATES OF 1,2,3 - TRISUBSTITUTED PYRAZOLONES AND PROCESSES OF PRODUCING SUCH COMPOSITIONS

Jules H. T. Ledrut, Brussels, Belgium, assignor to Luxema S. A., Ixelles, Brussels, Belgium, a company of Luxemburg Application December 19, 1950, Serial No. 201,626
In the Netherlands December 22, 1949

7 Claims. (Cl. 260—240)

This invention relates to substituted and unsubstituted barbiturates and thiobarbiturates of 1,2,3-trisubstituted pyrazolones and processes of producing such compositions.

An object of this invention is to provide compositions which, upon administration to humans or animals, possess antithermic and hypnotic characteristics.

While antipyrine (1-phenyl-2,3-dimethyl-5-pyrazolone) and other 1,2,3-trisubstituted pyrazolones produce a pronounced antithermic effect upon administration to humans and animals, no hypnotic characteristics is discernible on such administration. There is a need for compositions which effect both hypnotic and antithermic characteristics. Although many attempts have been made to produce such compositions, no such satisfactory compositions have been heretofore proposed.

In accordance with this invention compositions are produced which upon administration to humans or animals manifest pronounced antithermic and hypnotic characteristics. The compositions of this invention are represented by either of the two following formulas:

(1) 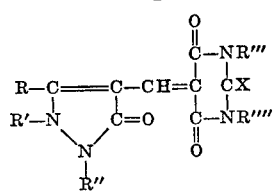

in which R, R' and R'' are alkyl radicals, aryl radicals, substituted alkyl radicals or substituted aryl radicals; R''' and R'''' are hydrogen, alkyl radicals or aryl radicals; and X is oxygen or sulfur; or (2) 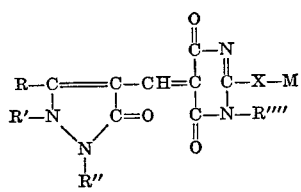

in which R, R', R'', R'''' and X have the same meaning as heretofore defined; and M is hydrogen, an alkali metal, the ammonium radical, an alkylamine radical, an alkanolamine radical, a polymethylenediamine radical or a stoichiometric equivalent of a metal of the second group of the periodic table. Throughout this description and the claims R, R', R'', R''', R'''', X and M have the same meaning as heretofore defined.

Examples of the radicals which may constitute R, R' and R'' are the methyl, ethyl, propyl, phenyl, ethoxyphenyl, methoxyphenyl and naphthyl. Examples of the radicals which may constitute R''' or R'''' are methyl, ethyl, propyl, phenyl and naphthyl. Examples of the salts which may be produced in accordance with Formula 2 above are the salts of sodium potassium, calcium, magnesium ethylamine, phenylamine and tetramethyldiamine.

The compositions of this invention are produced by reacting an aldehyde of a 1,2,3-trisubstituted pyrazolone having the formula:

(3) 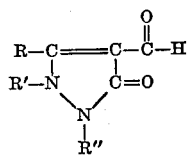

with a malonyl-urea or malonyl-thiourea having the formula:

(4) 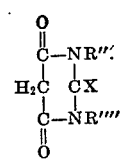

The reaction between the aldehyde of 1,2,3-trisubstituted pyrazolone and the malonyl-urea or malonyl-thiourea is conveniently conducted in a suitable solvent such as water by contacting preferably a heated solution, such as an aqueous solution, of the aldehyde with a heated solution, such as an aqueous solution, of the malonyl-urea or malonyl-thiourea. With certain substituted malonyl-urea and thioureas which are only slightly soluble in water, an alcohol water medium is used. Desirably, an excess of the malonyl-urea or malonyl-thiourea is employed. A ratio of two mols of malonyl-urea or malonyl-thiourea to one mol of the aldehyde has been found convenient for this purpose. The reaction mixture is heated for a period of about one hour at about 100° C. The resulting condensation product which is represented by the Formula 1 above is in the form of a precipitate in the reaction mixture and is removed by any convenient means, such as filtration, decantation or centrifugation. It may then be air-dried, and if purification is desired, it may be recrystallized in a suitable solvent, such as ethyl alcohol.

The aldehydes of the 1,2,3-trisubstituted pyrazolones may be prepared by several methods, including the publications of J. Ledrut and G.

Combes in Bull. Soc. Chim. France, 1950, pages 127 and 228. An additional process for the preparation of these aldehydes is the subject matter of my co-pending application Ser. No. 201,706, filed December 19, 1950.

If a composition represented by Formula 2 above is desired, a composition having the following formula:

(5)
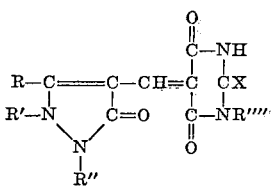

is added to a solution of the required base, such as an aqueous solution of sodium hydroxide, potassium hydroxide or ammonium hydroxide. After the composition of Formula 5 has substantially completely dissolved, the solution may be filtered, and the filtrate concentrated by evaporation of a portion of the solvent, such as water. The salt, having the formula of 2 above, separates as a precipitate during the concentration and may be washed with a suitable solvent, such as absolute alcohol followed by ether. The compositions of Formula 5 above are produced by the methods heretofore described for the preparation of the compositions of Formula 1.

The antithermic and hypnotic properties of the compositions of this invention are illustrated by reference to the accompanying drawing in which:

Fig. 1 is a graph showing the antithermic properties of the condensation product of the aldehyde of 1-phenyl - 2,3 - dimethyl - 5 - pyrazolone with malonyl-urea, and Fig. 2 is a graph showing the hypnotic properties of that condensation product.

Fig. 1 shows graphically the change in temperature of four dogs of 10 to 12 kilos in weight, all of which were injected with a dose of .5 cc. per kilo of a polyvalent vaccine known as "Propidon" and containing attenuated strains of streptococci, staphylococci and pyrocyanic bacilli, and three of which were also administered different dosages of the condensation product of the aldehyde of 1-phenyl-2,3-dimethyl-5-pyrazolone with malonyl-urea. The vaccine is capable of producing a pronounced thermic reaction in animals. The condensation product was administered orally substantially simultaneously with the vaccine. One of the three dogs was administered 1.5 grams of the condensation product; another 0.5 gram; and the third 0.2 gram. One hour after the administration of the condensation product, all four dogs were again injected with a dose of 0.5 cc. per kilo of body weight of the polyvalent vaccine.

The origin of the ordinates of Fig. 1 indicates the temperature of the dogs prior to the administration of the condensation product. The solid line in Fig. 1 represents the variation in body temperature over the period of test of the dog treated with the polyvalent vaccine without any administration of the condensation product (control). The curve in broken full strokes indicates the variation in respect of time of the temperature of the dog that was administered a dose of 1.5 grams of the condensation product in addition to the injection of the polyvalent vaccine. The dot and dash line in Fig. 1 indicates the variation in respect of time of the temperature of the dog that was administered 0.5 gram of the condensation product in addition to the injection of the polyvalent vaccine. Finally the dotted or short stroke curve indicates the variation in respect of time in the temperature of the dog that was administered 0.2 gram of the condensation product in addition to the injection of the polyvalent vaccine. An examination of these curves demonstrates that at the dosages employed the condensation product showed marked inhibiting effects of the hyperthermy engendered by the administration of the polyvalent vaccine.

Comparative tests have shown that in order to obtain an antithermic action exerted by a dose of 2.3 grams of antipyrine, a does of 0.5 gram of the condensation product is sufficient. Moreover, in other tests, it has been shown that the condensation product of the aldehyde of 1-phenyl-2,3-dimethyl-5-pyrazolone and malonyl-urea effects the same antithermic action for substantially identical dosages by weight as the aldehyde of 1 - phenyl-2,3-dimethyl-5-pyrazolone. Since malonyl-urea has no antithermic action when administered in dosages of 1 gram per kilogram of rabbit (Houben-Fortschritte der Heilstoffchemie—2nd volume—3—page 1099) and since the 1-phenyl-2,3-dimethyl-5-pyrazolone moiety in the condensation product constitutes a significant proportion of that product by weight, the antithermic action of the aldehyde is markedly increased by its conversion to the condensation product.

Fig. 2 shows graphically the hypnotic effect of the condensation product of the aldehyde of 1-phenyl-2,3-dimethyl-5-pyrazolone with malonyl-urea. In the experiments, the results of which are shown in Fig. 2, three of four bitches having gastric fistura were administered via the gastric canal doses of 1, 1.5 and 2 grams of the condensation product one hour prior to the injection of a dose of standard insulin having a concentration of a unit per kilo of body weight. A fourth bitch used as a control was injected with the insulin, but was not administered any of the condensation product. The injection of the insulin produces a post-insulinic gastric reaction, and the paralyzing properties of the condensation product upon the activity of the hypothalamic nervous system for each dosage was determined by ascertaining the number of cubic centimeters of gastric juice secreted by the bitches over a period of 120 minutes. The results of these experiments are plotted in Fig. 2 in which the solid curve shows the gastric juice secreted over the period of test by the bitch that was injected with the insulin but was not administered any of the condensation product (control), the broken solid line curve, the gastric juice secreted by the bitch that was administered 2 grams of the condensation product, the dot and dash curve shows the gastric juice secreted by the bitch that was administered 1.5 gram of the condensation product, and dotted or short stroke curve shows the gastric juice secreted by the bitch that was administered 1 gram of the condensation product.

An examination of these curves reveals that, at the dosages indicated, the condensation product manifested marked inhibiting effect of post-insulinic gastric hypertension, demonstrating the powerful hypnotic effect of the condensation product.

A more comprehensive understanding of this invention is obtained by reference to the following examples:

Example 1

2.16 grams of the aldehyde of 1-phenyl-2,3-dimethyl-5-pyrazolone are dissolved in 10 cc. of water. 1.28 grams of malonyl-urea are likewise dissolved in 10 cc. of water. The solutions obtained are mixed and heated on a steam bath.

Crystals form which are a yellow-orange color. These crystals are air-dried and recrystallized in ethyl alcohol.

The crystals melt at about 254°–256° C. They are only slightly soluble in organic solvents.

The reaction which takes place in the production of the condensation product is as follows:

(6)

$$H_3C-C=C-\overset{O}{\overset{\|}{C}}-H \quad + \quad H_2C\begin{array}{c}\overset{O}{\overset{\|}{C}}-NH\\CO\\\overset{\|}{C}-NH\\\overset{\|}{O}\end{array} \longrightarrow$$

$$H_3C-N\underset{\underset{C_6H_5}{|}}{\underset{N}{|}}C=O$$

Aldehyde of 1-phenyl-2,3-dimethyl-5-pyrazolone   Malonyl-urea $$H_2O + H_3C-C=C-CH=C\begin{array}{c}\overset{O}{\overset{\|}{C}}-NH\\CO\\\overset{\|}{C}-NH\\\overset{\|}{O}\end{array}$$

$$H_3C-N\underset{\underset{C_6H_5}{|}}{\underset{N}{|}}C=O$$

Quantitative analysis of the condensation product which has the formula $C_{16}H_{14}O_4N_4$ reveals the following percentages of elements in comparison with the theoretical percentages:

|  | C | H | N |
|---|---|---|---|
| Calculated | 58.89 | 4.29 | 17.17 |
| Found | 58.16 | 4.35 | 16.92 |

To produce the sodium salt of the condensation product, the product is dissolved in a solution of sodium hydroxide containing a slight excess of the sodium hydroxide required to theoretically produce the sodium salt of the condensation product. The resulting solution is filtered, and the filtrate is concentrated on a steam bath. The sodium salt precipitates during the concentration. The precipitate is washed with absolute ethyl alcohol and with ether. It is a yellowish white powder which is infusible and soluble in cold water.

Example 2

2.76 grams of the aldehyde of 1,3-diphenyl-2-methyl-5-pyrazolone are dissolved in 40 cc. of 20% ethyl alcohol. 6.40 grams (5 times the theoretical quantity) of recrystallized malonyl-urea is furthermore dissolved in 150 cc. of boiling water (Umgerr. Ber. 36, p. 1 and 222—1903).

The two solutions are then mixed. In the course of the mixing, there appears at first a red coloring, then a bright yellow crystalline precipitate, which is aired, dried and recrystallized in dioxane.

The yield of condensation product is 90%.

The condensation product obtained has the formula $C_{21}H_{16}O_4N_4$ and melts at about 274–5° C.

Quantitative analysis of the condensation product shows the following results compared with theoretical quantities:

|  | C | H | N |
|---|---|---|---|
| Calculated | 64.94 | 4.12 | 14.43 |
| Found | 64.74 | 4.63 | 14.28 |

Example 3

2.16 grams of the aldehyde of 1-phenyl-2,3-dimethyl-5-pyrazolone and 2.04 grams of phenyl-malonyl-urea are dissolved in 50 cc. of 60% ethyl alcohol.

The solution obtained is heated under reflux for 4 hours. By cooling and dilution by means of water the condensation product of antipyrine-phenylbarbituric acid is precipitated, and may be purified by recrystallization in ethyl alcohol. The product melts at about 190° C.

Quantitative analysis of this condensation product, which has the formula $C_{22}H_{18}O_4N_4$, shows the following results:

|  | C | H | N | O |
|---|---|---|---|---|
| Calculated | 65.67 | 4.47 | 15.92 | 13.03 |
| Found |  |  | 15.48 | 13.47 |

Example 4

To 2.16 grams of the aldehyde of 1-phenyl-2,3-dimethyl-5-pyrazolone dissolved in 10 cc. of warm water are added 1.44 grams of thiobarbituric acid dissolved in 50 cc. of warm water.

A yellow-red precipitate forms immediately, which is aired, dried and recrystallized in dioxane.

The yield in condensation product aldehyde of antipyrine–thiobarbituric acid is 2.5 grams. It melts at 238–40° C. (dec.)

Quantitative analysis of the condensation product, which has the formula $C_{30}H_{22}O_5N_4S$ (with one molecule of dioxane of crystallization), reveals the following results:

|  | C | H | N | O | S |
|---|---|---|---|---|---|
| Calculated | 55.81 | 5.14 | 13.03 | 18.60 | 7.44 |
| Found | 55.57 | 5.15 | 12.84 | 18.43 | 7.35 |
|  | 55.56 | 5.21 |  |  | 7.55 |

Example 5

0.110 gram of the aldehyde of 1-phenyl-2,3-dimethyl-5-pyrazolone is dissolved in 5 cc. of water. To this solution is added 0.150 gr. of diphenyl-malonyl-urea dissolved in 30 cc. of water.

By mixing the two solutions in the warm state, a yellow precipitate forms, which is aired, dried and recrystallized in the ethyl alcohol. It melts at about 280° C. (dec.)

The condensation product obtained has the formula:

(7)

$$H_3C-C=C-CH=C\begin{array}{c}\overset{O}{\overset{\|}{C}}-N-C_6H_5\\CO\\\overset{\|}{C}-N-C_6H_5\\\overset{\|}{O}\end{array}$$

$$H_3C-C\underset{\underset{C_6H_5}{|}}{\underset{N}{|}}C=O$$

Quantitative analysis of the condensation product, which has the empirical formula $C_{28}H_{22}O_4N_4$, reveals the following results:

|  | C | H | O | N |
|---|---|---|---|---|
| Calculated | 70.29 | 4.60 | 13.33 | 11.71 |
| Found |  |  | 13.39 | 11.55 |

Example 6

Other condensation products in accordance with this invention are produced in the same manner as described in Examples 1 to 4. The aldehyde of the 1,2,3-trisubstituted pyrazolone and the malonyl-urea or malonyl-thiourea, whether substituted or unsubstituted, may be dissolved independently in water. The solutions may then be mixed and heated on a steam bath. The resulting condensation product may be purified by recrystallization in a suitable solvent, such as water or alcohol. The same technique is employed when certain substituted malonyl-ureas and thioureas are involved which are only slightly soluble in water. In those cases, an alcohol or alcohol water medium is used to effect the reaction. For example, the condensation product of the aldehyde of 1-ethoxyphenyl-2,3-dimethyl-5-pyrazolone and malonyl-urea was produced by following the general method described in this example. The resulting condensation product, which has the formula $C_{18}H_{18}O_5N_5$, melts at 266–267° C. The product contained 15.09% nitrogen compared with a theoretical value of 15.13%.

The terms and expressions which are employed herein are used as terms of description and not of limitation, and there is no intention, in the use of such terms and expressions, of excluding any equivalents of the features described or portions thereof, but it is recognized that various modifications are possible within the scope of the invention claimed.

What is claimed is:

1. A composition selected from the class consisting of compositions having the formula:

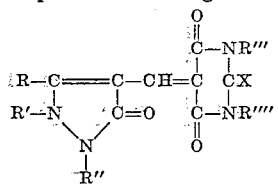

and compositions having the formula:

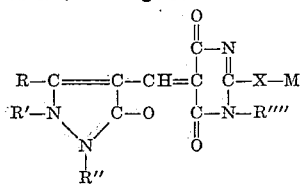

in which R is a member selected from the class consisting of lower alkyl radicals and monocyclic aryl radicals, R' is a lower alkyl radical, R'' is a monocyclic aryl radical; and R''' and R'''' are members selected from the class consisting of hydrogen, lower alkyl radicals and monocyclic aryl radicals; X is a member selected from the class consisting of oxygen and sulfur; and M is a member selected from the class consisting of alkali metals, the ammonium radical, alkylamine radicals, alkanolamine radicals, polymethylenediamine radicals and the stoichiometric equivalents of the metals of the second group of the periodic table.

2. The method of producing a condensation product of the aldehyde of a 1,2,3-trisubstituted pyrazolone with a member selected from the class consisting of malonyl-urea, malonyl-thiourea, substituted malonyl-ureas and substituted malonyl-thioureas, said method comprising reacting the aldehyde of a 1,2,3-trisubstituted pyrazolone having the formula:

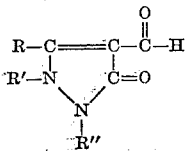

with a member selected from the class consisting of malonyl-urea, malonyl-thiourea, substituted malonyl-ureas, and substituted malonyl-thioureas and having the formula:

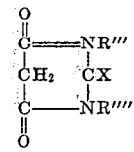

in which R is a member selected from the class consisting of lower alkyl radicals and monocyclic aryl radicals, R' is a lower alkyl radical, R'' is a monocyclic aryl radical; and R''' and R'''' are selected from the class consisting of hydrogen, lower alkyl radicals and monocyclic aryl radicals; X is a member selected from the class consisting of oxygen and sulfur; and M is a member selected from the class consisting of alkali metals, the ammonium radical, alkylamine radicals, alkanolamine radicals, polymethylenediamine radicals and the stoichiometric equivalents of the metals of the second group of the periodic table.

3. A composition having the formula:

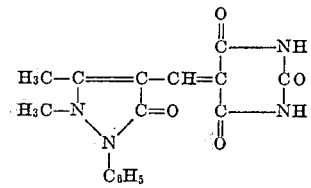

4. A composition having the formula:

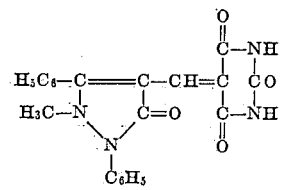

5. A composition having the formula:

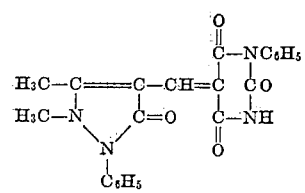

6. A composition having the formula:

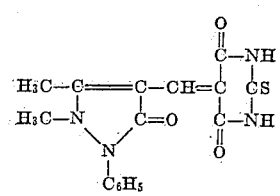

7. A composition having the formula:

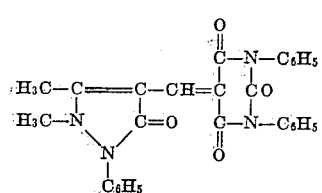

JULES H. T. LEDRUT.

No references cited.